(12) United States Patent
Luckjohn

(10) Patent No.: US 12,448,071 B2
(45) Date of Patent: Oct. 21, 2025

(54) SEAT BASE WITH FLEXIBLE FINGERS

(71) Applicant: Harley-Davidson Motor Company, Inc., Milwaukee, WI (US)

(72) Inventor: Kenneth G. Luckjohn, Sheboygan, WI (US)

(73) Assignee: Harley-Davidson Motor Company, Inc., Milwaukee, WI (US)

( * ) Notice: Subject to any disclaimer, the term of this patent is extended or adjusted under 35 U.S.C. 154(b) by 177 days.

(21) Appl. No.: 17/984,891

(22) Filed: Nov. 10, 2022

(65) Prior Publication Data

US 2024/0158033 A1 May 16, 2024

(51) Int. Cl.
*B62J 1/08* (2006.01)
*B62J 1/02* (2006.01)

(52) U.S. Cl.
CPC .. *B62J 1/08* (2013.01); *B62J 1/02* (2013.01)

(58) Field of Classification Search
CPC ...................................... B62J 1/02; B62J 1/08
See application file for complete search history.

(56) References Cited

U.S. PATENT DOCUMENTS

| | | | |
|---|---|---|---|
| 6,254,180 B1 | 7/2001 | Nelson | |
| 6,629,728 B2 | 10/2003 | Losio et al. | |
| 6,739,656 B2 | 5/2004 | Yu | |
| 7,367,619 B2 | 5/2008 | Fregonese et al. | |
| 7,837,260 B2 | 11/2010 | Hein et al. | |
| 7,980,629 B2 * | 7/2011 | Bedard | B62M 27/02 297/195.12 |
| 8,512,842 B2 | 8/2013 | Segato | |
| 8,568,641 B2 | 10/2013 | Segato | |
| 9,345,328 B2 | 5/2016 | Peterson et al. | |
| 10,384,737 B2 | 8/2019 | Schram | |
| 2010/0243691 A1 * | 9/2010 | Salisbury | B62J 7/04 224/555 |

* cited by examiner

*Primary Examiner* — Philip F Gabler
(74) *Attorney, Agent, or Firm* — Michael Best & Friedrich LLP

(57) ABSTRACT

A straddle vehicle including a seat assembly with at least one seating area for a person straddling the vehicle. The seat assembly includes a seat base, and one or more upholstery layers disposed atop the seat base. A frame of the straddle vehicle supports the seat assembly. The seat base and the frame form a mount for securing the seat assembly into an assembled position with respect to the frame. A body structure is coupled to the frame in an assembled position directly adjacent to a peripheral edge portion of the seat assembly such that, in their respective assembled positions, the peripheral edge portion contacts an interfering portion of the body structure. The seat base, in the peripheral edge portion, is partitioned into a plurality of flexible fingers that conform to a shape of the interfering portion of the body structure.

20 Claims, 8 Drawing Sheets

SEAT BASE WITH FLEXIBLE FINGERS

BACKGROUND

The present invention is directed to a vehicle seat and more particularly to a vehicle seat for a straddle vehicle, such as a motorcycle. Motorcycles and other straddle vehicles can be offered by a manufacturer in numerous configurations, and sometimes user-customizable. Additionally, the seat on a straddle vehicle often forms an exposed top side surface of the vehicle and held in its assembled position by a latch and/or fasteners that enable full removal of the seat. A seat base separate from the upholstery layers forms a hidden structural bottom layer of the seat and provides the mechanical interface for fastening the seat to the underlying frame.

SUMMARY

In one aspect, the invention provides a straddle vehicle including a seat assembly with at least one seating area for a person straddling the vehicle. The seat assembly includes a seat base, and one or more upholstery layers disposed atop the seat base. A frame of the straddle vehicle supports the seat assembly. The seat base and the frame form a mount for securing the seat assembly into an assembled position with respect to the frame. A body structure is coupled to the frame in an assembled position directly adjacent to a peripheral edge portion of the seat assembly such that, in their respective assembled positions, the peripheral edge portion contacts an interfering portion of the body structure. The seat base, in the peripheral edge portion, is partitioned into a plurality of flexible fingers that conform to a shape of the interfering portion of the body structure.

In another aspect, the invention provides a seat assembly for a straddle vehicle. The seat assembly includes a seating area for a person straddling the vehicle, the seating area having a narrowing width toward a forward end of the seat assembly. A seat base having a bottom surface provides an interface for selectively mounting with and releasing from the straddle vehicle. One or more upholstery layers are disposed atop the seat base and defining a top surface of the seat assembly at which the seating area is defined. The seat base includes a peripheral edge portion partitioned into a plurality of flexible fingers at the forward end.

In yet another aspect, the invention provides a method of assembling a seat assembly on a straddle vehicle. The method includes providing the seat assembly having a seat base and one or more upholstery layers disposed atop the seat base, providing a frame of the vehicle with an exposed surface configured to form a mutual mounting interface with the seat base, and providing a body structure of the vehicle secured to the frame adjacent and interfering with an assembly position of the seat assembly. The seat assembly is secured to the frame with a movement toward an assembled position. During the movement to secure the seat assembly to the frame, a plurality of flexible fingers provided in a peripheral edge portion of the seat base are elastically deflected to accommodate interference between the seat assembly and an interfering portion of the body structure.

Figure 1:
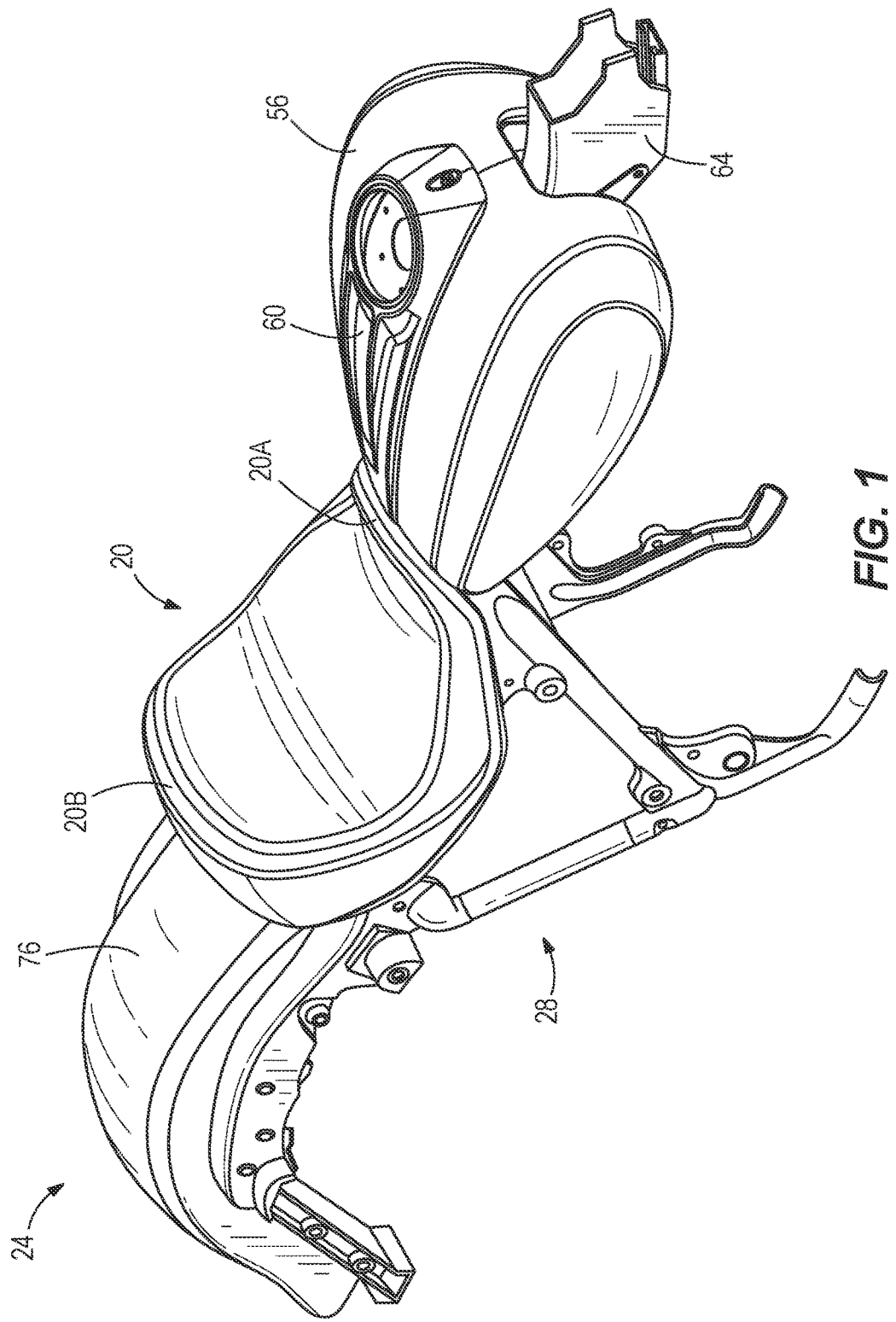
FIG. 1 is a perspective view of a portion of a motorcycle including a seat assembly according to one embodiment of the present disclosure.

Before explaining one or more embodiments of the invention in detail, it is to be understood that the invention is not limited in its application to the details of construction and the arrangement of the components set forth in the following description or illustrated in the drawings. The invention is capable of other embodiments, which can be practiced or carried out in various ways. Also, it is to be understood that the phraseology and terminology employed herein is for the purpose of description and should not be regarded as limiting.

DETAILED DESCRIPTION

Figure 3:
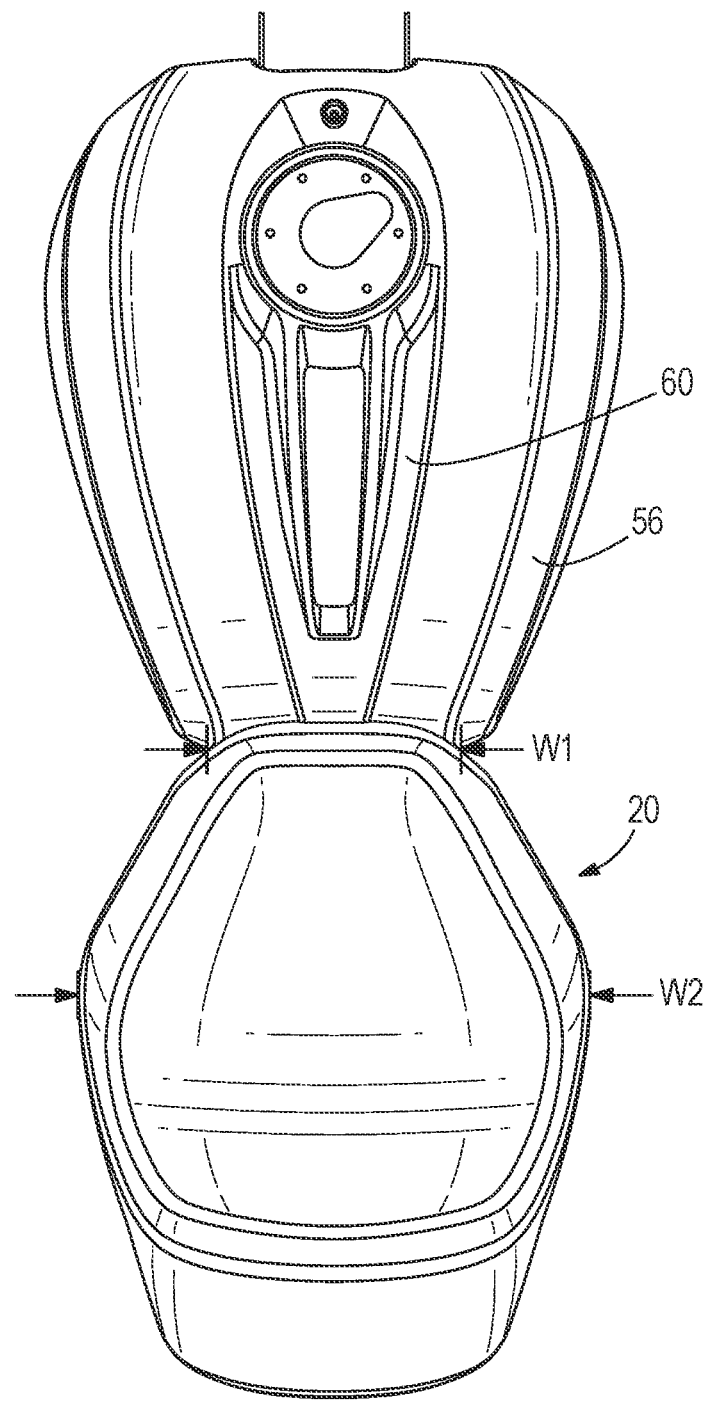
FIG. 3 is a top view of the seat assembly in an assembled position against a rear portion of a fuel tank of the motorcycle.

The present disclosure provides a seat assembly 20 for a straddle vehicle or "saddle ride" vehicle such as the exemplary motorcycle 24, a portion of which is shown in FIG. 1. The motorcycle 24 includes a frame 28 that is elongated in a longitudinal direction for supporting a single front wheel and a single rear wheel directly behind the front wheel, defining a single track. Other configurations, for example tricycle configurations with either two front wheels or two rear wheels are optional. Four wheel configurations of a straddle vehicle can be embodied in the form of an all-terrain vehicle (ATV), for example. The seat assembly 20 of the illustrated construction is a single or solo seat having a single seating area configured to support the buttocks of a single individual (i.e., rider/operator). The seating area is defined between a front end 20A and a rear end 20B of the seat assembly 20. The rear end 20B can have a backstop portion or ridge with upward slope. The front end 20A is tapered to a narrowed width W1 (FIG. 3) compared to a maximum width W2 which is further rearward, such as in a rear or central portion. The width W1 at the front end 20A can be 70 percent or less than the maximum width W2. The reduced width W1 not only conforms to the shape and aesthetic of the motorcycle 24, but also facilitates positioning between the legs of the seated person.

The seat assembly 20 includes a seat base 40 as a lowermost portion or layer, and a cover 42 as an uppermost or outermost portion. The seat base 40 is predominantly or completely concealed from view when the seat assembly 20 is mounted on the motorcycle 24. The seat base 40 can have a rigid construction (e.g., of engineering plastic, composite, etc.) providing structure for supporting the remainder of the seat assembly 20. The cover 42 (e.g., constructed of leather, vinyl, or similar material) forms the durable exposed contact surface on the outside of the seat assembly 20 and can cover one or more intermediate layers (e.g., foam 44, FIG. 8). The cover 42 and the foam 44 constitute upholstery layers that provide occupant comfort and a desirable aesthetic, which cannot be achieved by the seat base alone.

As shown in FIG. 1, the motorcycle 24 includes a fuel tank assembly having a fuel tank 56 and a console 60 provided on a top surface of the fuel tank 56. The console 60 can extend longitudinally along a majority of the length of the fuel tank 56. The console 60 can have a forward portion provided with an opening for a fuel cap, or alternately an instrument gauge or display. A rear end of the console 60 can be coupled to the frame (e.g., with a single fastener) at a position under the seat base 40. However, the seat base 40 can include an opening or access port exposing the joint coupling the console 60 to the frame 28. This joint can be integrated with a portion of the sliding mount described below. The fuel tank 56 is centrally located across the width of the motorcycle 24 and is positioned directly in front of the seat assembly 20, which is the subject of further description below. The fuel tank 56 can be provided as a single-wall vessel, or alternately with an internal vessel for receiving fuel and a decorative fuel tank cover over the internal vessel. The fuel tank 56 is shown to straddle a central, longitudinally extending backbone portion 64 of the frame 28 (FIG. 1). Whatever form it takes, the fuel tank assembly constitutes a fixed body structure of the motorcycle 24 as it is generally immovable with respect to the frame 24 once mounted. It is also noted that, short of destructive means, the structure of the fuel tank assembly is rigid and generally lacks flexibility.

Figure 2:
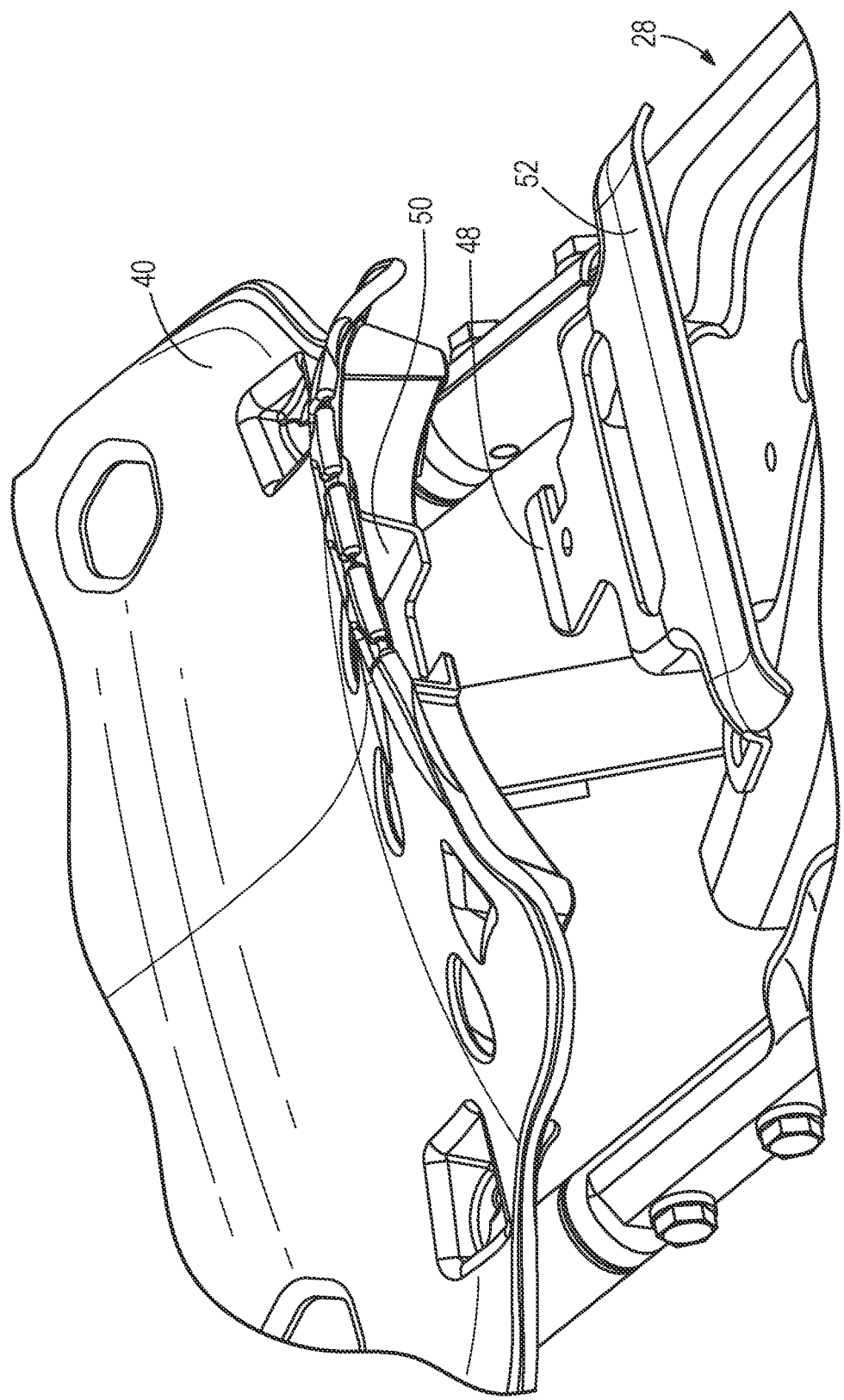
FIG. 2 is an exploded perspective view of a seat base and frame of the motorcycle of FIG. 1.

The seat base 40 has a front end that defines a mount, for example a sliding mount, with the frame 28. As shown in FIG. 2, the sliding mount includes a tab 48 and a recess or pocket 50 for receiving the tab 48 when assembled or mounted. In the illustrated construction, the tab 48 is provided (e.g., rearwardly extending) on a bracket 52 of the frame 28, and the pocket 50 is provided (e.g., forwardly opening) on the seat base 40. In other constructions, the components of the sliding mount may be alternately configured and/or reversed between the frame 28 and the seat base 40. In some constructions, there may be a plurality of sliding mounts between the frame 28 and the seat base 40. The sliding mount can be configured to require a movement of the seat assembly 20 with respect to the frame 28, such as a movement that is one or both of forward and downward. In some cases, a pivoting movement of the seat assembly 20 may be required to secure the mount when assembling. As described further below, the assembly movement of the seat assembly 20 can require contact and deformation between a portion of the seat assembly 20 and the fuel tank assembly.

Figure 4:
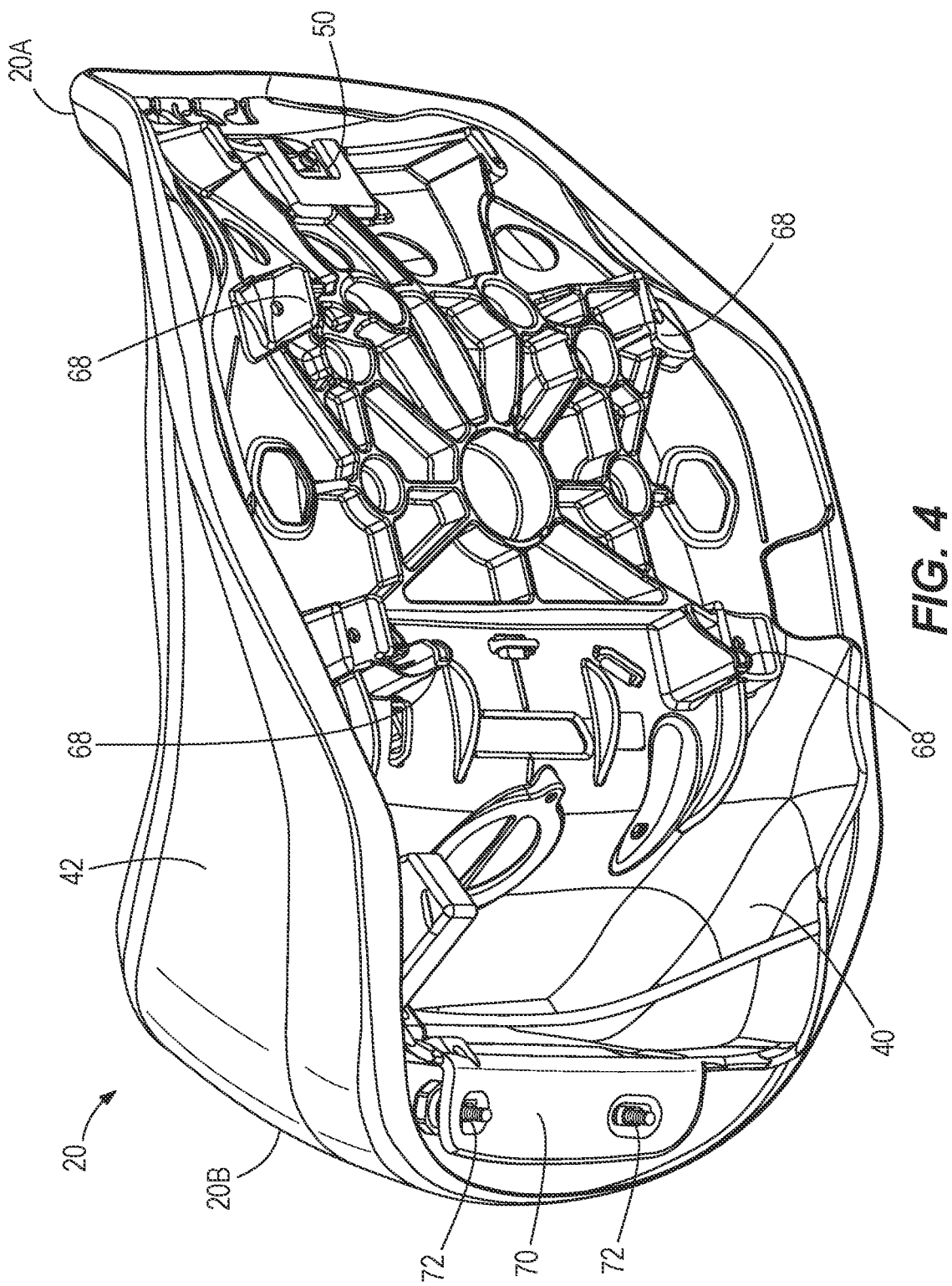
FIG. 4 is a perspective view of an underside of the seat assembly removed from the motorcycle.

FIG. 4 illustrates the seat assembly 20 from below, showing a bottom surface of the seat base 40 that is ribbed for enhanced rigidity. Under the seating area and within the ribbed section, the seat base 40 includes a plurality of mounting portions, embodied as bosses 68. Each of the mounting bosses 68 can protrude downward, and each can include an opening configured to receive a fastener for securing the seat assembly 20 to the frame 28. The mounting bosses 68 can provide standoffs that situate a majority of the seat base 40, particularly in the area corresponding to the seating area, spaced up above the frame 28. At the rear end 20B of the seat assembly, the seat base 40 includes a mounting flange 70. The mounting flange 70 can include one or a plurality of openings for receiving respective mounting fasteners 72. In some constructions, the fasteners 72 can be screws that extend up from below a rear fender 76 of the motorcycle 24. The fasteners 72 can be threaded into nuts positioned on a top side of the mounting flange 70. In some constructions a further seat for a pillion passenger can be mounted directly behind the seat assembly 20, and optionally using some shared mounting points and/or fasteners. In other constructions, the seat assembly 20 is modified to include both a forward seating area for rider/operator and a rear seating area for a pillion passenger, all with one continuous seat base.

Figure 5:
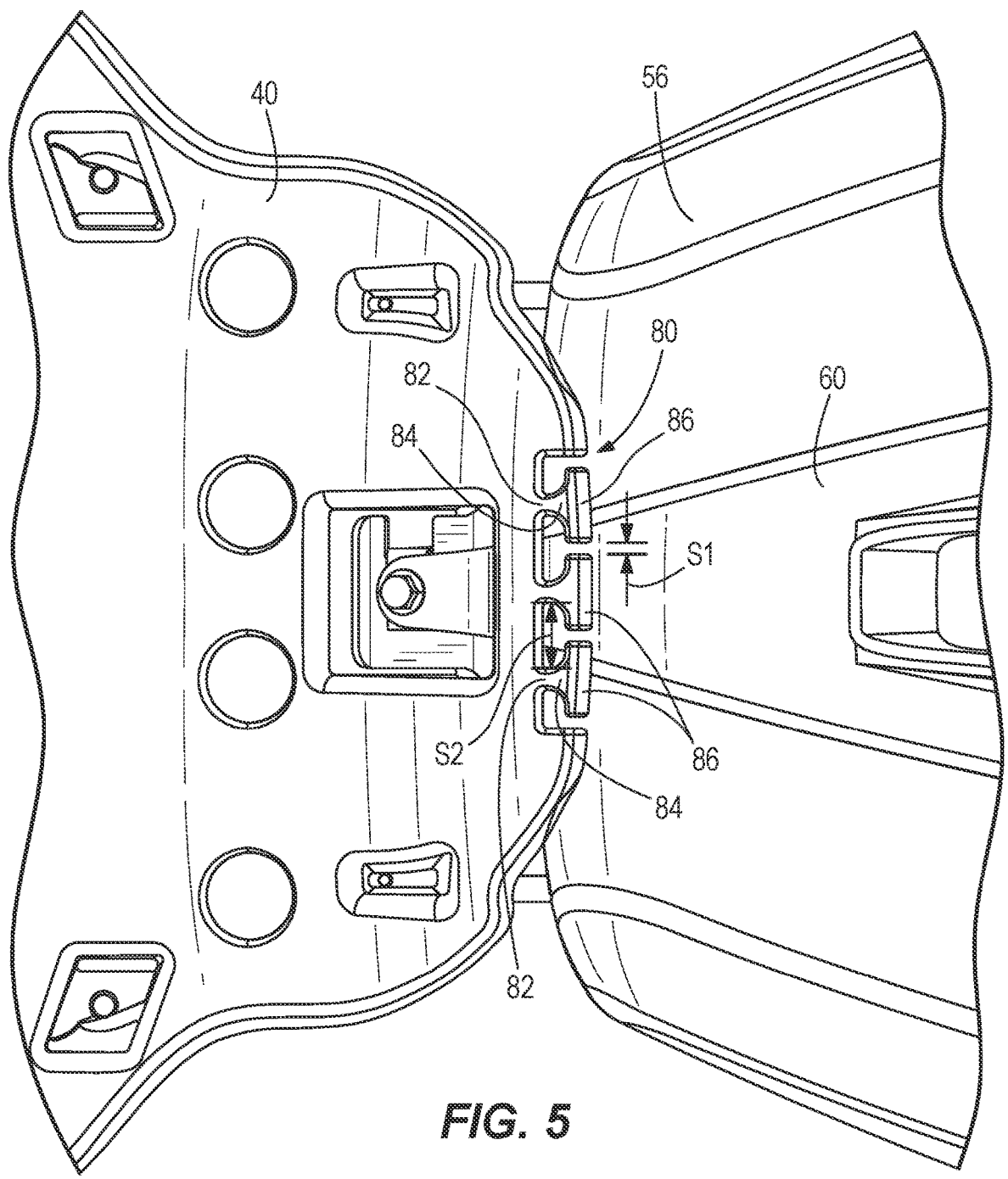
FIG. 5 is a detail top view showing a front portion of the seat base, including a plurality of flexible fingers.
Figure 6:
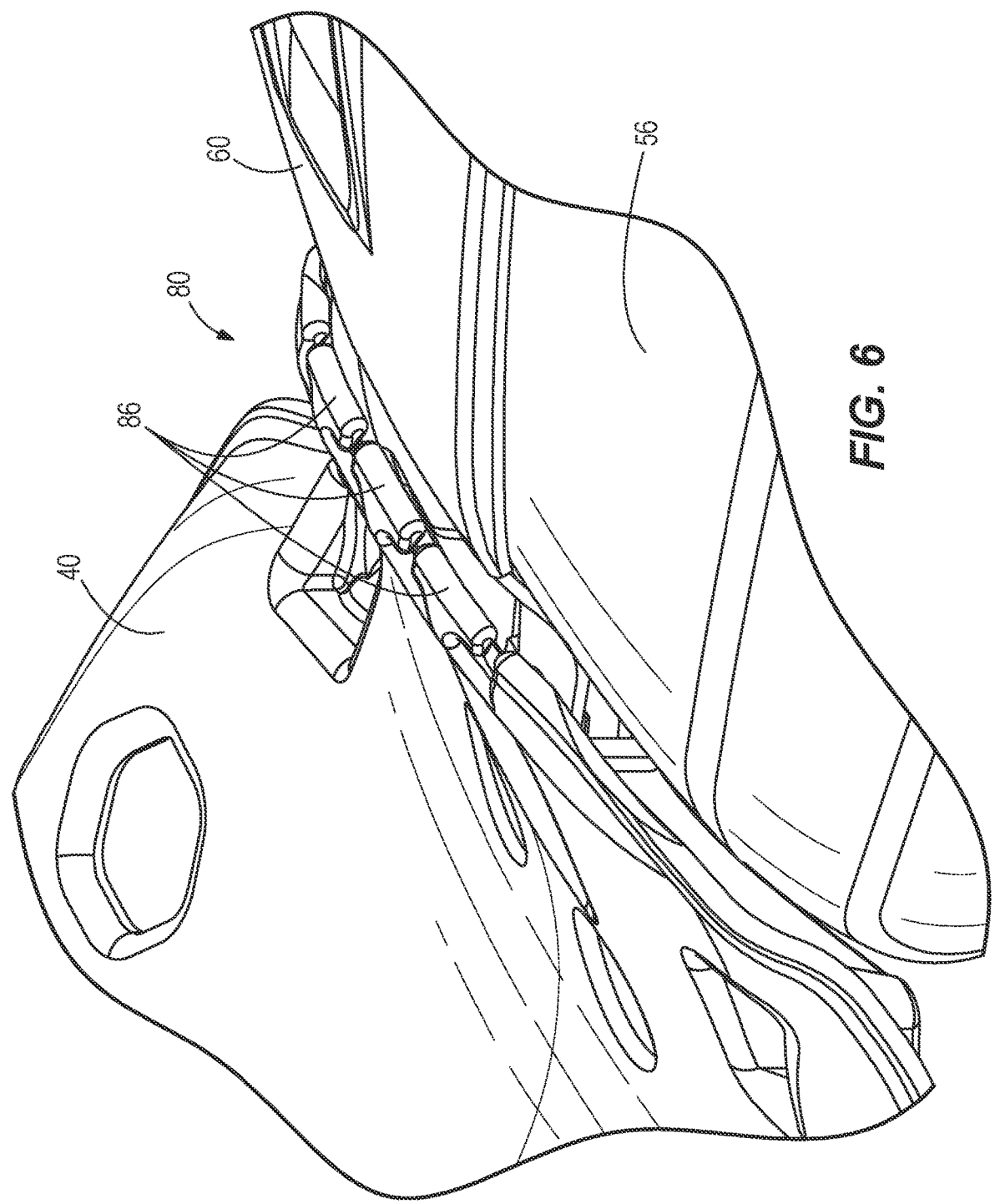
FIG. 6 is a perspective view of the front portion of the seat base shown in FIG. 5.

With respect to FIGS. 2, 5, and 6 in particular, it is shown that the seat base 40, in a peripheral edge portion (e.g., a front or forward edge portion), is partitioned into a plurality of flexible fingers 80. As described in further detail below, the flexible fingers 80 serve to allow the otherwise rigid seat base 40 to locally conform to a shape of an interfering structure mounted to the frame 28 adjacent the seat assembly 20. In the illustrated construction, the interfering structure is the fuel tank assembly. Furthermore, the partitioned flexible portion with the fingers 80 is limited to a central region of the seat base 40 (e.g., less than the front end width W1, and less than half the maximum width W2). Each of the flexible fingers 80 includes a base portion 82 spaced rearward of the forward peripheral edge portion. The base portions 82 can be integrally formed or fixedly secured with the rest of the seat base 40 to form proximal portions of the fingers 80. Each flexible finger 80 projects outward from the base portion 82 to define an elongate neck portion 84. As illustrated, the neck portions 84 extend forwardly from the respective base portions 82. The neck portion 84 of each finger 80 terminates at a distal tip or head portion 86. The head portions 86 can have a rounded profile as viewed in FIGS. 7 and 8. The head portions 86 can be formed with a greater cross-sectional area than the neck portions 84 such that the flexibility of the fingers 80 is predominantly or entirely provided by the base and/or neck portions 82, 84. In other words, flexure in the fingers 80 will cause the head portions 86 to move relative to the remainder of the seat base 40, but the head portions themselves are substantially without deformation.

The respective head portions 86 form a discontinuous part of the peripheral edge portion of the seat base 40. In other words, the head portions 86 lie along a contour established by adjacent edge portions that are separated from each other by the portion that is subdivided into the fingers 80. Additionally, across the width direction, the head portions 86 are substantially wider than the neck portions 84 so as to leave only small gaps along the peripheral edge portion of the seat base 40. This serves to inhibit witnessing of the fingers 80 through the upholstery when the fingers 80 are forced to flex upwardly into the upholstery. In some constructions, the spacing distance S1 between two adjacent head portions 86 (FIG. 5) is less than one-third or less than one-fourth of the spacing distance S2 between the neck portions 84 of the two adjacent fingers. In some constructions, the spacing distance S1 between two adjacent head portions 86 is less than 7 mm or less than 5 mm.

Figure 7:
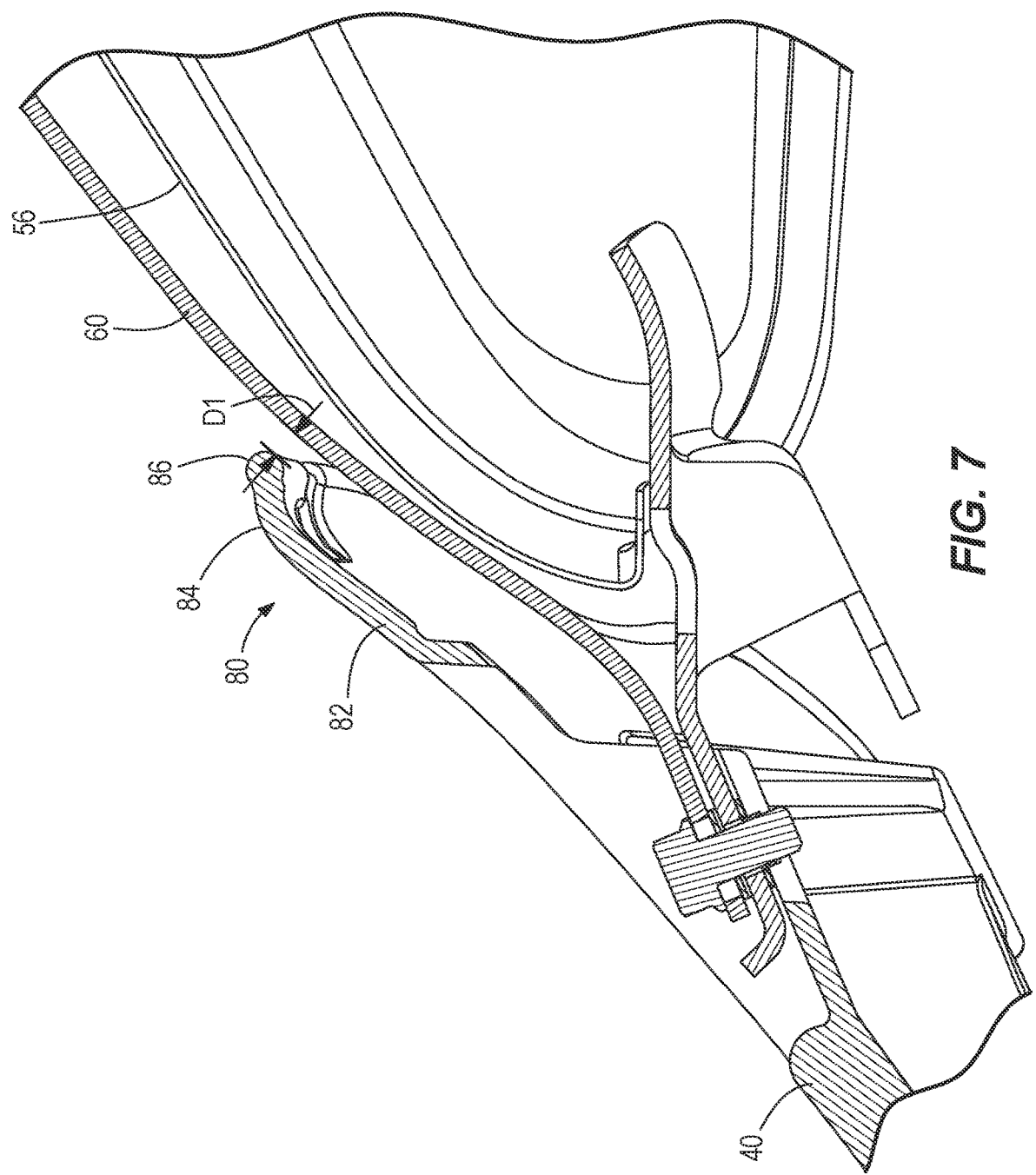
FIG. 7 is a cross-section of the seat base assembled to the motorcycle frame, without any upholstery layers attached to the seat base.
Figure 8:
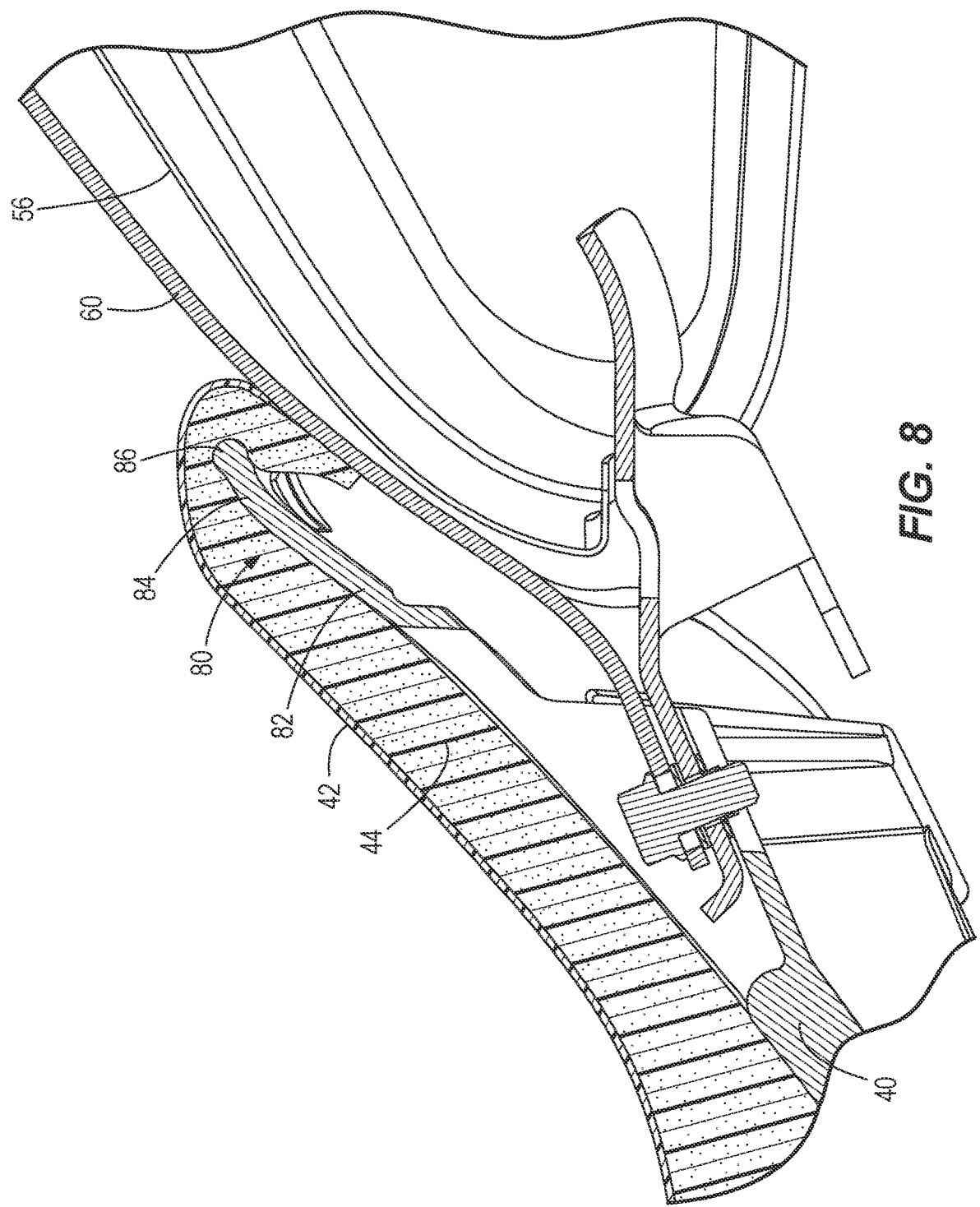
FIG. 8 is a cross-section of the seat assembly, with upholstery, assembled to the motorcycle frame, requiring deflection of the flexible fingers of the seat base.

FIGS. 6 and 7 illustrate the seat base 40 and also the fuel tank 56 and console 60 in their assembled positions on the frame 28. The seat base 40 is shown without the upholstery (e.g., cover 42 and foam 44) attached. As such, the natural or at-rest state of the flexible fingers 80 can be observed. In this at-rest, assembled state, the head portions 86 of the flexible fingers 80 are spaced a distance D1 (FIG. 7) from the nearest portion of the fuel tank assembly (e.g., the upper surface of a lower end of the console 60). However, as shown in FIG. 8, the complete seat assembly 20 with the upholstery layers mounted on the seat base 40 does not allow the fingers 80 to assume the at-rest position, but rather, forces the fingers 80 to assume a deflected position due to the upholstery coming into contact with the fuel tank assembly. In other words, the uncompressed thickness of the upholstery between the flexible fingers 80 and the fuel tank assembly is greater than the spacing distance D1 shown in FIG. 7—requiring compression of one or more portions of the seat assembly 20 to enable assembly against the fuel tank assembly. It is also noted here that the flexible fingers are contoured in a direction toward the interfering structure of the fuel tank assembly such that the head portions 86 constitute the closest parts of the flexible fingers 80 (i.e., the parts with the most potential interference). In alternate constructions, the flexible fingers 80 can have an alternate curved contour, or a straight contour. In alternate constructions, the flexible fingers may contact the fuel tank assembly or other fixed body structure directly, rather than contacting through the upholstery.

As mentioned above, the plurality of fingers 80 allow flexing of the peripheral edge portion of the seat base 40 to absorb the packaging interference between the seat assembly 20 and the fuel tank assembly (one or both of the fuel tank 56 and the console 60). In other constructions, flexible fingers like those shown in the seat base 40 can be configured to deflect to absorb interference with a different body structure on the motorcycle 24 or another vehicle.

Various alternatives to the disclosed embodiment(s) are contemplated as being within the scope of the claims of the present invention. It is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention.

What is claimed is:

1. A straddle vehicle comprising:
   a seat assembly including at least one seating area for a person straddling the vehicle, the seat assembly including
      a seat base, and
      one or more upholstery layers disposed atop the seat base;
   a frame supporting the seat assembly, the seat base and the frame forming a mount for securing the seat assembly into an assembled position with respect to the frame; and
   a body structure coupled to the frame in an assembled position directly adjacent to a flexible portion of the seat base formed at a front peripheral edge of the seat base such that, in their respective assembled positions, the flexible portion has interference with an interfering portion of the body structure,
   wherein the seat base, in the flexible portion, is partitioned into a plurality of flexible fingers that are held in an elastically deflected state, conforming to a shape of the interfering portion of the body structure when the seat assembly and the body structure are in their respective assembled positions.

2. The straddle vehicle of claim 1, wherein the plurality of flexible fingers have respective base portions, respective neck portions extending outwardly from the respective base portions, and respective head portions at the ends of the neck portions.

3. The straddle vehicle of claim 2, wherein the respective head portions are enlarged with respect to the neck portions.

4. The straddle vehicle of claim 1, wherein the interfering portion of the body structure is a fuel tank assembly.

5. The straddle vehicle of claim 4, wherein the fuel tank assembly includes a console situated on top of a fuel tank, and the interfering portion includes a portion of the console.

6. The straddle vehicle of claim 1, wherein the plurality of flexible fingers have rounded distal tip portions.

7. The straddle vehicle of claim 1, wherein the mount is a sliding mount formed by respective mounting portions of the seat base and the frame that are configured to join together by movement of the seat assembly with respect to the frame in a direction of one or both of forward and downward.

8. The straddle vehicle of claim 7, wherein a spacing distance between adjacent ones of the head portions is less than one-third of a spacing distance between adjacent ones of the neck portions.

9. The straddle vehicle of claim 7, wherein the respective head portions are spaced apart a distance not more than 7 mm.

10. The straddle vehicle of claim 7, wherein in the respective assembled positions of the seat assembly and the body structure, a portion of the one or more upholstery layers is compressed between the interfering portion of the body structure and the plurality of flexible fingers.

11. The straddle vehicle of claim 10, wherein the one or more upholstery layers is constituted by a cover and a foam, and wherein the cover forms a durable exposed contact surface of the seat assembly.

12. The straddle vehicle of claim 11, wherein the cover is constructed of leather.

13. The straddle vehicle of claim 11, wherein the cover is constructed of vinyl.

14. The straddle vehicle of claim 10, wherein the portion of the one or more upholstery layers has a thickness that forces the plurality of flexible fingers to assume the elastically deflected state when the seat assembly and the body structure are in their respective assembled positions.

15. The straddle vehicle of claim 7, wherein the sliding mount includes a tab and a pocket for receiving the tab.

16. The straddle vehicle of claim 1, wherein the plurality of flexible fingers are limited to a central region of the front peripheral edge.

17. The straddle vehicle of claim 1, wherein the seat base has a bottom surface that is ribbed.

18. The straddle vehicle of claim 1, wherein the seat base includes mounting bosses configured to receive a fastener for securing the seat assembly to the frame.

19. The straddle vehicle of claim 1, wherein the seat assembly defines a front end and a rear end, and the front end has a narrowed width compared to a maximum width of the seat assembly.

20. The straddle vehicle of claim 19, wherein the narrowed width is 70 percent or less than the maximum width.

* * * * *